United States Patent [19]

Koumatsu et al.

[11] Patent Number: 5,435,605
[45] Date of Patent: Jul. 25, 1995

[54] LOCKING STRUCTURE OF WATERPROOF CONNECTOR

[75] Inventors: Seiji Koumatsu; Kimihiro Abe, both of Shizuoka, Japan

[73] Assignee: Yazaki Corporation, Tokyo, Japan

[21] Appl. No.: 199,029

[22] Filed: Feb. 18, 1994

[30] Foreign Application Priority Data

Feb. 22, 1993 [JP] Japan .................. 5-005835 U

[51] Int. Cl.⁶ ........................................ F16L 17/025
[52] U.S. Cl. ........................... 285/110; 285/231; 285/347; 285/319; 277/208
[58] Field of Search ............... 277/208; 285/110, 319, 285/910, 347, 111, 112, 230, 231, 232

[56] References Cited

U.S. PATENT DOCUMENTS

| | | | |
|---|---|---|---|
| 2,816,782 | 12/1957 | Anderson | 285/231 X |
| 2,980,449 | 4/1961 | Dunton | 277/208 X |
| 3,081,102 | 3/1963 | Murray et al. | 277/208 X |
| 3,315,971 | 4/1967 | Sakurada | 277/208 X |
| 3,334,928 | 8/1967 | Schmunk | 277/208 X |
| 3,430,989 | 3/1969 | Wendt | 285/230 X |
| 3,877,733 | 4/1975 | Straub | 285/112 X |
| 4,343,480 | 8/1982 | Vassallo | 285/110 X |
| 4,371,179 | 2/1983 | Bohman | 277/208 X |
| 5,058,907 | 10/1991 | Percebuis et al. | 285/910 X |
| 5,138,117 | 8/1992 | Gikawa et al. | 277/208 X |
| 5,360,218 | 11/1994 | Percebois et al. | 285/232 X |

FOREIGN PATENT DOCUMENTS 919602 2/1963 United Kingdom ............. 285/112

Primary Examiner—Eric K. Nicholson
Assistant Examiner—Heather Chun Shackelford
Attorney, Agent, or Firm—Armstrong, Westerman, Hattori, McLeland & Naughton

[57] ABSTRACT

A locking structure of a connector with a waterproof packing to prevent incomplete locking of the connector. The locking structure comprises: a waterproof packing attached to the first connector half; two rows of sealing lips with a first sealing lip and a second sealing lip integrally formed with the waterproof packing, the first sealing lip being taller than the second sealing lip, wherein the second connector half is inserted into the waterproof packing, and slidably contacts the first sealing lip in the first stage and then slidably contacts the second sealing lip to lock the waterproof connector.

3 Claims, 4 Drawing Sheets

F I G. 2A          F I G. 2B
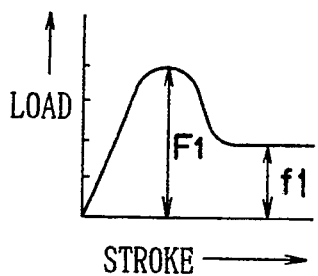 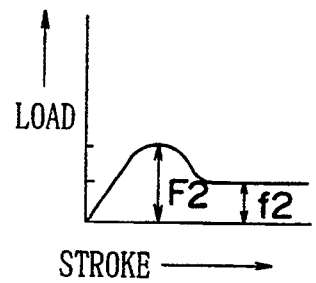
F I G. 3A          F I G. 3B
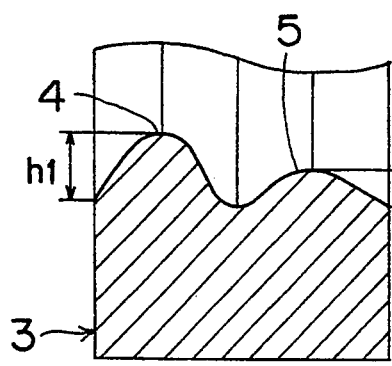 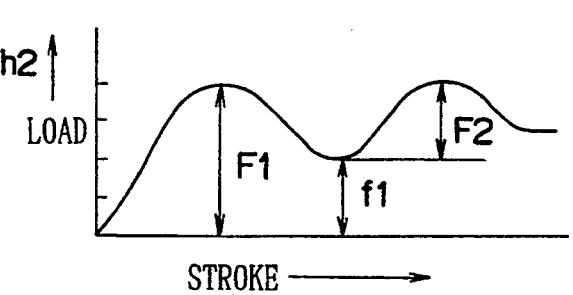
F I G. 4
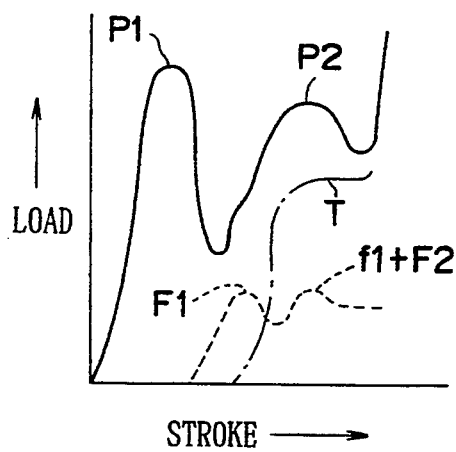

FIG. 5A
PRIOR ART
FIG. 5B
PRIOR ART
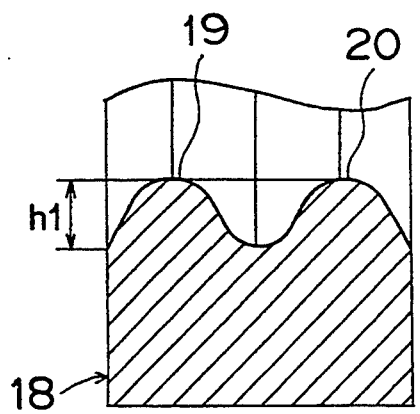
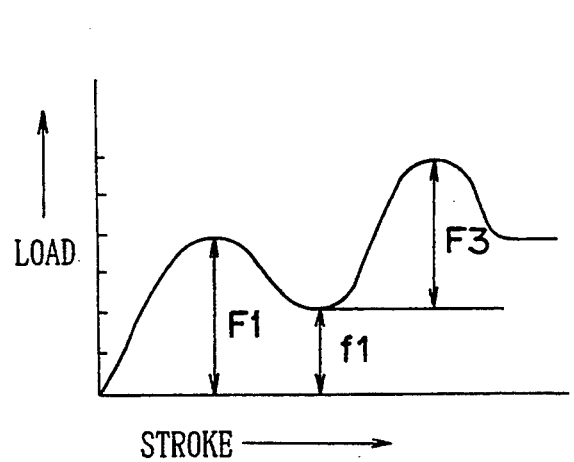
FIG. 6A
FIG. 6B
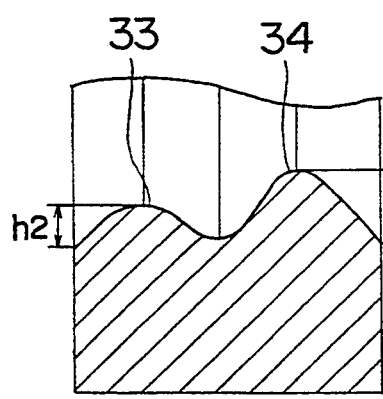
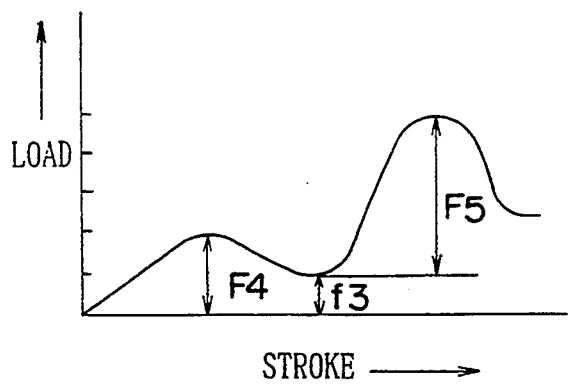

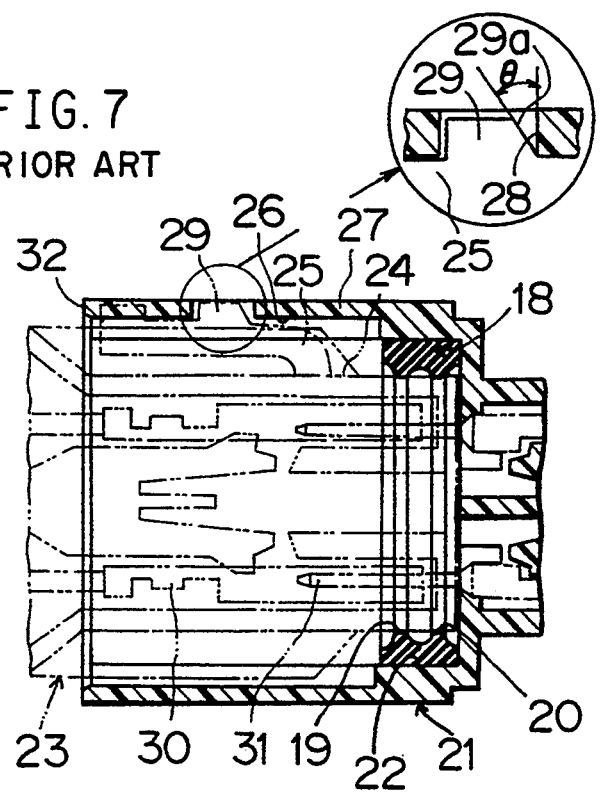
FIG. 7 PRIOR ART
FIG. 7A PRIOR ART
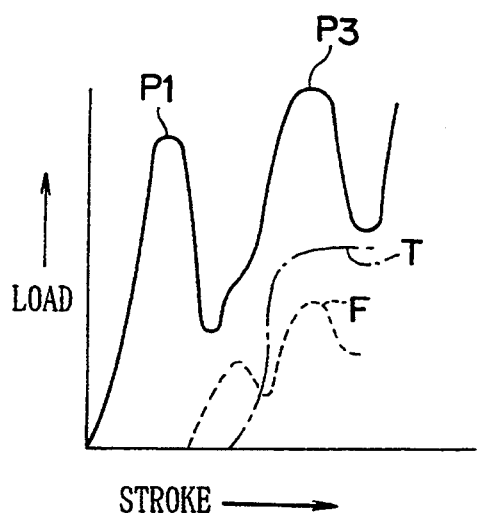
FIG. 8 PRIOR ART

LOCKING STRUCTURE OF WATERPROOF CONNECTOR

BACKGROUND OF THE INVENTION

1. Field the Invention

This invention relates to a locking structure of a connector with a waterproof packing to prevent incomplete locking of the connector.

2. Description of the Prior Art

FIG. 7 is a longitudinally cross-sectional view of a locking structure of a conventional waterproof connector which is disclosed Japanese Utility Model Laid-Open No. Showa 63-150479.

In this structure, a waterproof packing 18 made of rubber with two rows of sealing lips 19 and 20 is fixed to an inner wall 22 of a housing of a female connector part 21, and a male connector part 23 slidably contacts the two rows of sealing lips 19 and 20 when connected to the female connector part 21.

On an outer wall 24 of a housing of the male connector part 23 is disposed a resilient locking arm 25 to engage a locking projection 29 thereon with a locking hole 28 on an inner wall 26 of the female connector part 21 the instant the both connector parts 21 and 23 are completely locked. A female terminal 30 in the male connector part is engaged with a male terminal 31 in the female connector part 21.

However, with the construction described above, as indicated in FIG. 8 showing the relation between the stroke of the male connector half 23 with respect to the female connector half 21 and connector insertion force which is required to insert the male connector part 23 to the female connector part 21, the sum P3 of force required for causing the male connector half to proceed against the packing 18 and force T required for connecting both terminals with each other 30 and 31 is larger than load P1 applied to the locking arm 25 (load required to deflect the locking arm 25 when a front inclined face 29a of the locking projection 29 abuts a front end face 32 of the housing of the female connector part 21), which prevents an operator from sensing the engagement of the locking projection 29 with the locking hole 28 from a feeling thereof by of the hand. As a result, occasionally, the locking projection 29 is not engaged with the locking hole 28, resulting in incomplete connection of the connector parts 21 and 23. Although the load P1 may be increased by decreasing the inclined angle $\theta$ of the front face 29a of the locking projection 29, larger force is required to engage the both connector parts.

SUMMARY OF THE INVENTION

It is therefore an object of the present invention to eliminate the drawbacks described above and provide a locking structure of a waterproof connector in which the engagement of the locking projection of the locking arm with the locking hole is sensed by the operator from the feeling of the hand thereof without increasing the load of the locking arm to prevent the incomplete engagement of the connector.

The locking structure of a waterproof connector with first and second connector parts according to the present invention comprises: a waterproof packing attached to the first connector part; two rows of sealing lips with a first sealing lip and a second sealing lip integrally formed with the waterproof packing, the first sealing lip being taller than the second sealing lip, wherein the second connector part is inserted into the waterproof packing, and slidably contacts the first sealing lip in the first stage and then slidably contacts the second sealing lip to lock the waterproof connector.

BRIEF DESCRIPTION OF THE DRAWINGS

The present invention will be more apparent from the ensuring description with reference to the accompanying drawing wherein:

FIGS. 2A and 2B are the relation between the stroke of a male connector part with respect to a female connector and connector insertion force applied to the male connector part when the male connectors part slidably contacts a first sealing lip or a second sealing lip in the present invention;

FIGS. 3A and 3B show cross sections of the first and second sealing lips, and the connector insertion force applied to the male connector part when slidably contacts the first and second sealing lips according to the present invention;

FIG. 4 shows the connector insertion force according to the present invention;

FIGS. 5A and 5B are a cross-sectional view of sealing lips of a conventional locking structure of a waterproof connector and load applied to a locking arm when slidably contacting the sealing lips;

FIGS. 6A and 6B are a cross sectional view of a waterproof packing with sealing lips of which heights are inversely designed to the present invention, and load applied to the locking arm when slidably contacting the sealing lips;

FIG. 7 is a longitudinally cross-sectional view of a locking structure of a conventional waterproof connector; and FIG. 8 shows connector insertion force in the conventional waterproof connector illustrated in FIG. 7.

DETAILED DESCRIPTION OF PREFERRED EMBODIMENTS

Figure 1:
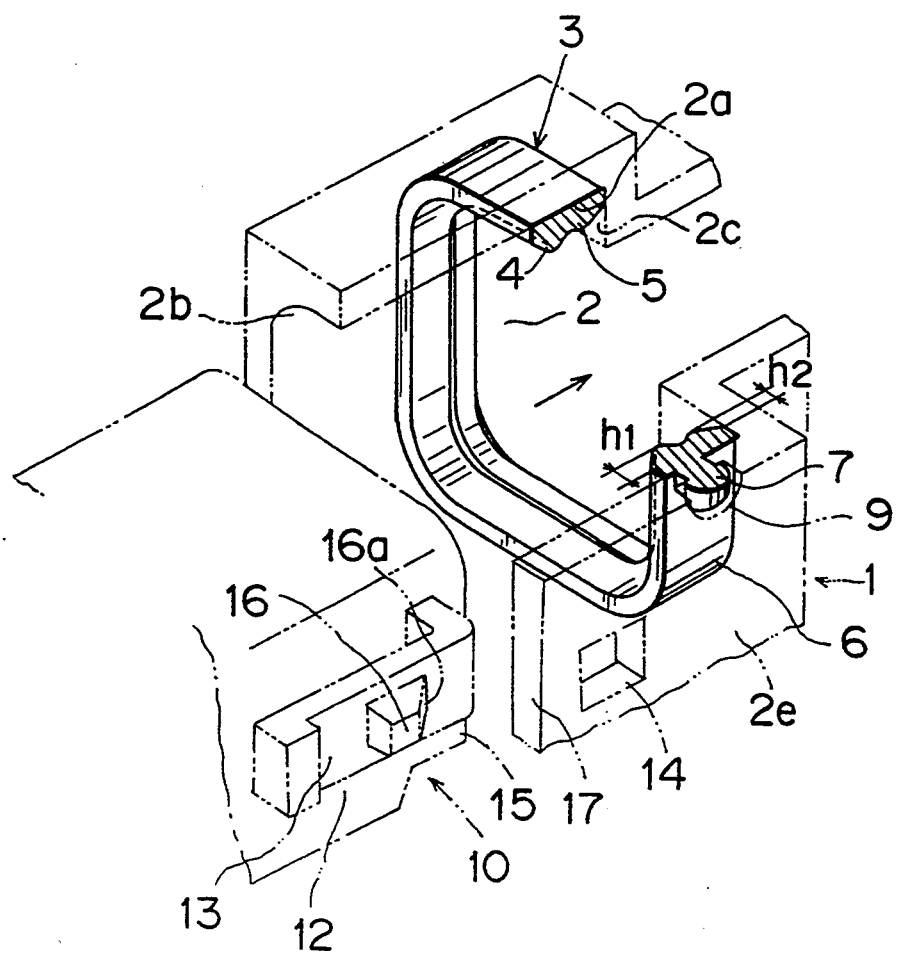
FIG. 1 is an exploded perspective view of a primary portion of a locking structure of a waterproof connector according to an embodiment of the present invention.

Referring to FIG. 1, a rectangular waterproof packing 3 with two rows of sealing lips 4 and 5 is disposed on an inner wall 2a of a locking chamber 2 of a housing of a female connector part 1. The two rows of sealing lips 4 and 5 comprise a first sealing lip 4 and a second sealing lip 5 which are in parallel with each other, and the first sealing lip is situated on the side of an opening of the locking chamber 2. The locking structure according to the present invention is characterized in that the height h1 of the first sealing lip 4 is greater than the height h2 of the second sealing lip 5.

A locking projection 7 on an outer wall 6 of the waterproof packing 3 is inserted into a locking hole 9 on the inner wall of the female connector part 1 to fix the waterproof packing 3 to the locking chamber 2. Further, a male connector part 10 is inserted into and engaged with the locking chamber 2 of the female connector part 1 and a resilient locking arm 13 on an outer wall 12 of the male connector part 10 engages a locking hole 14 on an inner wall 2e of the locking chamber 2. During the insertion of the male connector part 10 into the locking chamber 2, an outer front wall 15 of the male connector part 10 slidably contacts a first sealing lip 4 and a second sealing lip 5 of the waterproof packing 3 one after another so that the outer front wall 15 of the male connector part 10 is inwardly urged by the sealing lips 4 and 5.

Referring to FIGS. 2A and 2B, the load F1 applied to the male connector part 10 when abutting the first lip 4 is substantially two times the load f1 applied to the male connector part 10 during the sliding contact with the first lip 4, and the load F2 applied to the male connector part 10 when abutting the second lip 5 is decreased to a half of the load F1. Further, the load f2 applied to the male connector part 10 during the sliding contact with the second sealing lip 5 is reduced to about a half of the load F2.

When the male connector part 10 contacts the first and second sealing lips 4 and 5 one after another, the load F1 is applied to the male connector part 10, and then the sum (f1+F2) of the load f1 at the sliding contact with the first sealing lip 4 and the load F2 at the abutment with the second sealing lip 5 as illustrated in FIG. 3B. As described above, the load f1 is about a half of the load F1, and the load F2 is substantially a half of the load F1 so that the sum f1+F2 is almost the same as the load F1, which prevents the connector insertion force from being increased at the latter half in the connecting operation.

FIG. 4 shows the relation between the load applied to the male connector part 10 during the connection work and the stroke thereof. As clearly indicated in the figure, a peak P2 is lower than a peak P1, which means the sum P2 of the load (f1+F2) resisting the packing 3 and load T required for connecting terminals themselves is smaller the load P1 required to deflect the locking arm 13 when an inclined front face 16a of the locking projection 16 abuts a front end face 17 of the housing of the female connector part 1. As a result, the operator can completely connect the both connector halves 1 and 10 substantially simultaneously making use of the load (inertial force) P1, which is required to insert the locking arm 13 into the locking chamber 2.

The height h1 of the first sealing lip 4 of the waterproof packing 3 according to the embodiment of the present invention is substantially the same as the height h1 of the conventional sealing lip 18 illustrated in FIG. 7 to prevent intrusion of water from outside while reducing the connector insertion force.

FIGS. 5A and 5B show the shape and the connector insertion force of the conventional sealing lip 18. The sum (f1+F3) of the load f1 at the sliding contact of the first sealing lip 19 (about one half of the load F1) and the load F3 at the abutment of the second sealing lip 20 (substantially the same as the load F1), which are indicated in FIG. 5B, is 1.5 times the sum (f1+F2) of the load f1 at the sliding contact with the first lip 4 and the load F2 at the abutment of the second lip 5, which are indicated in FIG. 3B, resulting in increased load at the latter half of the connecting operation.

On the other hand, when a second sealing lip 34 is taller than a first sealing lip 33 as illustrated in FIG. 6A, the sum (f3+F5) of load f3 (about a half of the load f1) at the sliding contact with a first sealing lip 33 and load F5 at the abutment of a second sealing lip 34 (about two times larger than the load f1) is (5/2)×f1, that is, 1.25 times the sum f1+F2 (about two times the load f1), as clearly understood from FIGS. 3B and 6B. Therefore, it is proved the first sealing lip 33 should be taller than the second sealing lip 34 to decrease the connector insertion force.

As described above, with the locking structure of the waterproof connector, the first sealing lip which contacts the mated connector part at-the-first stage is taller than the second lip which secondarily contacts the mated connector. As a result, the load required to connect the connector is decreased at the latter half of the connecting operation, which permits the force (inertial force) applied to the connector part for deflecting the locking arm at the former part of the connecting operation to complete the locking of the connector. Further, incomplete locking of the connector is prevented since the feeling of the hand at the locking of the connectors is properly sensed by the operator.

What is claimed is:

1. A locking structure of a waterproof connector with first and second connector parts comprising:
   a waterproof packing attached to the first connector part;
   two axially spaced rows of convexly shaped sealing lips integrally formed on said waterproof packing and projecting from a surface of said first connector part, said sealing lips including a first sealing lip and a second sealing lip of which said first sealing lip is taller than the second sealing lip,
   wherein when the second connector part is inserted into the waterproof packing, it sequentially slidably contacts the first sealing lip and then the second sealing lip to lock the waterproof connector.

2. The locking structure of a waterproof connector with first and second connector parts as claimed in claim 1, wherein said waterproof packing is accommodated in an inner wall of said first connector part.

3. The locking structure of a waterproof connector with first and second connector parts as claimed in claim 1, wherein the height of said first sealing lip is two times the height of the second sealing lip.

* * * * *